(12) United States Patent
Garozzo et al.

(10) Patent No.: US 7,979,164 B2
(45) Date of Patent: Jul. 12, 2011

(54) LOW VOLTAGE POWER LINE COMMUNICATION FOR CLIMATE CONTROL SYSTEM

(75) Inventors: James P. Garozzo, St. Louis, MO (US); William P. Butler, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 445 days.

(21) Appl. No.: 12/250,209

(22) Filed: Oct. 13, 2008

(65) Prior Publication Data

US 2009/0065597 A1 Mar. 12, 2009

Related U.S. Application Data

(62) Division of application No. 11/299,601, filed on Dec. 12, 2005, now Pat. No. 7,434,744.

(51) Int. Cl.
*G05B 13/00* (2006.01)
*F24F 11/00* (2006.01)

(52) U.S. Cl. ............... 700/276; 236/1 C; 62/132

(58) Field of Classification Search ............ 700/276; 340/310.11; 236/51, 1 C; 62/132, 178; 165/200
See application file for complete search history.

(56) References Cited

U.S. PATENT DOCUMENTS

| | | | |
|---|---|---|---|
| 4,307,775 A | 12/1981 | Saunders et al. ............ 165/11.1 |
| 4,325,112 A * | 4/1982 | Otsuka ............................ 363/42 |
| 4,842,044 A | 6/1989 | Flanders et al. ............. 165/244 |
| 4,889,179 A | 12/1989 | Merenda ........................ 165/253 |
| 5,197,667 A * | 3/1993 | Bowsky et al. ............... 236/49.3 |
| 5,272,427 A * | 12/1993 | Nold et al. .................... 318/672 |
| 5,444,436 A * | 8/1995 | Kennison ...................... 340/635 |
| 5,566,879 A | 10/1996 | Longtin ...................... 236/46 R |
| 5,621,654 A * | 4/1997 | Cohen et al. .................. 700/287 |
| 5,706,190 A * | 1/1998 | Russ et al. ......................... 700/9 |
| 5,723,848 A * | 3/1998 | Bilenko et al. ............... 219/508 |
| 5,801,940 A * | 9/1998 | Russ et al. ........................ 700/9 |
| 5,900,179 A * | 5/1999 | Bilenko et al. ............... 219/508 |
| 5,929,749 A * | 7/1999 | Slonim et al. ............. 340/870.01 |
| 5,973,491 A * | 10/1999 | Onizuka et al. ............... 363/124 |
| 6,097,761 A * | 8/2000 | Buhring et al. ............... 375/257 |
| 6,108,614 A | 8/2000 | Lincoln et al. ............... 702/183 |
| 6,172,476 B1 * | 1/2001 | Tolbert et al. ................ 318/772 |
| 6,307,464 B1 | 10/2001 | Miller et al. ................. 340/653 |
| 6,320,494 B1 * | 11/2001 | Bartels et al. ............ 340/538.11 |
| 6,549,042 B2 * | 4/2003 | Proebsting ..................... 327/51 |
| 6,587,739 B1 * | 7/2003 | Abrams et al. ................. 700/83 |
| 6,647,735 B2 * | 11/2003 | Street et al. ..................... 62/132 |

(Continued)

*Primary Examiner* — Albert Decady
*Assistant Examiner* — Kelvin Booker
(74) *Attorney, Agent, or Firm* — Harness, Dickey & Pierce, P.L.C.

(57) ABSTRACT

A system for controlling one or more components of a climate control system is provided that includes one or more controllers in connection with low voltage power lines for powering the one or more controllers. The controllers are further capable of transmitting one or more communication signals via the low voltage waveform. The system includes a thermostat controller, at least one system controller for a heating or cooling system, and a controller for a circulating air blower. The thermostat controller, system controller and circulating air blower controller are connected to each other only through each controller's individual connection to the hot and common low voltage power transmission lines. Each controller is capable of transmitting one or more signals that are superimposed onto the low-frequency low-voltage waveform and include information identifying a destination controller that the signals are intended for.

15 Claims, 3 Drawing Sheets

U.S. PATENT DOCUMENTS

| | | | | |
|---|---|---|---|---|
| 6,708,083 | B2 * | 3/2004 | Orthlieb et al. | 700/276 |
| 6,798,341 | B1 | 9/2004 | Eckel et al. | 340/521 |
| 6,822,555 | B2 | 11/2004 | Mansfield, Jr. et al. | 340/538.11 |
| 6,894,254 | B2 * | 5/2005 | Hauschulz | 219/506 |
| 6,956,463 | B2 * | 10/2005 | Crenella et al. | 700/3 |
| 7,009,348 | B2 * | 3/2006 | Mogilner et al. | 315/307 |
| 7,047,753 | B2 * | 5/2006 | Street et al. | 62/126 |
| 7,150,408 | B2 * | 12/2006 | DeLuca | 236/94 |
| 7,194,528 | B1 * | 3/2007 | Davidow | 709/223 |
| 7,228,691 | B2 * | 6/2007 | Street et al. | 700/276 |
| 7,262,695 | B2 * | 8/2007 | Hicks, III | 340/538.12 |
| 7,270,278 | B2 * | 9/2007 | Street et al. | 236/51 |
| 7,331,187 | B2 * | 2/2008 | Kates | 700/276 |
| 7,334,417 | B2 * | 2/2008 | Tokushige et al. | 62/175 |
| 7,339,466 | B2 * | 3/2008 | Mansfield et al. | 340/538 |
| 7,434,744 | B2 * | 10/2008 | Garozzo et al. | 700/276 |
| 7,617,691 | B2 * | 11/2009 | Street et al. | 700/276 |
| 7,774,102 | B2 * | 8/2010 | Butler et al. | 700/276 |
| 7,795,994 | B2 * | 9/2010 | Radtke | 333/100 |
| 7,809,472 | B1 * | 10/2010 | Silva et al. | 700/277 |
| 7,841,542 | B1 * | 11/2010 | Rosen | 700/276 |
| 7,865,252 | B2 * | 1/2011 | Clayton | 700/19 |
| 2002/0011923 | A1 * | 1/2002 | Cunningham et al. | 340/310.01 |
| 2004/0066283 | A1 * | 4/2004 | Manis et al. | 340/310.01 |
| 2004/0154319 | A1 | 8/2004 | Jayanth et al. | 62/129 |
| 2005/0161211 | A1 | 7/2005 | Zeigler et al. | 165/240 |
| 2005/0169056 | A1 * | 8/2005 | Berkman et al. | 365/185.22 |
| 2005/0257543 | A1 | 11/2005 | Martin et al. | 62/228.1 |
| 2006/0017324 | A1 | 1/2006 | Pace et al. | 307/3 |
| 2006/0219382 | A1 | 10/2006 | Johnson et al. | 165/11.1 |
| 2007/0012052 | A1 * | 1/2007 | Butler et al. | 62/181 |
| 2008/0211663 | A1 * | 9/2008 | Mansfield et al. | 340/538 |
| 2008/0216495 | A1 * | 9/2008 | Kates | 62/129 |
| 2009/0002137 | A1 * | 1/2009 | Radtke | 340/310.11 |
| 2009/0065597 | A1 * | 3/2009 | Garozzo et al. | 236/51 |
| 2010/0211224 | A1 * | 8/2010 | Keeling et al. | 700/277 |

* cited by examiner

LOW VOLTAGE POWER LINE COMMUNICATION FOR CLIMATE CONTROL SYSTEM

CROSS-REFERENCE TO RELATED APPLICATIONS

This application is a divisional of U.S. patent application Ser. No. 11/299,601 filed on Dec. 12, 2005, now U.S. Pat. No. 7,434,744, the entire disclosure of the above application is incorporated herein by reference.

FIELD

The present invention relates to controllers for interactively controlling an HVAC system, and more particularly to an integrated system of HVAC controls for interactively controlling various components in the HVAC system

BACKGROUND

In present residential heating, ventilating and air conditioning systems, a 24 volt alternating current (AC) transformer provides low voltage power source for actuation of various components of the HVAC system. A wall thermostat within the space typically receives 24 volt AC, and transmits a 24 volt AC signal via a wire to a heating controller to request or activate heating, or via a second wire to an air conditioning compressor contactor to request or activate cooling. A 24 volt AC signal for requesting heating may be used to directly turn on a 24 volt AC electromechanical device to actuate heating, or the signal may be interpreted by the heating controller as an "on" signal. The 24 volt AC signal may be interpreted as "on" or "off" depending on the presence or absence of the 24 volt AC signal. For each additional thermostat command for other system components, such as a fan, heat pump, humidifier, etc., typically at least one new wire is required for the thermostat to transmit a 24 volt AC signal to the additional component. In the new construction of a building, the amount of wiring installed from the thermostat through the walls to the HVAC system components will accordingly depend on the complexity of the particular HVAC system. An HVAC system typically requires wiring for components such as a furnace controller, an air conditioning compressor relay or contactor, and a fan, but may require additional wiring for a heat pump or staged heating, staged cooling, a humidifier, an air cleaner, or other components. Once the construction is completed and the wiring is in place, subsequent replacement of the HVAC system can be affected by the number of existing wires installed from the thermostat through the walls. Likewise, replacing an older HVAC system and thermostat connected to each other by a minimum number of wires with a newer HVAC system having more functions may require the installation of more wiring, which can be labor intensive and costly.

SUMMARY

Various embodiments of a system for controlling one or more components of a climate control system are provided that include one or more controllers in connection with low voltage power lines for powering the one or more controllers. The controllers are further capable of transmitting one or more communication signals via the low voltage waveform. In one embodiment of a system for controlling at least one component of a climate control system comprises an alternating current power source that conducts a low-frequency low-voltage waveform across hot and common power transmission lines. The system includes a thermostat controller, a system controller for a heating or cooling system, and a controller for a circulating air blower. The thermostat controller, system controller and circulating air blower controller are connected to each other only through each controller's individual connection to the hot and common low voltage power transmission lines. Each controller is capable of transmitting one or more signals that are superimposed onto the low-frequency low-voltage waveform and include information identifying a destination controller that the signals are intended for.

In another embodiment of the present invention, a system is provided for controlling a climate control system that comprises an alternating current power source that conducts a low-frequency low-voltage waveform across hot and common power transmission lines. The system further comprises a thermostat controller, a controller for a heating system, and at least a controller for a compressor of a heat pump or air conditioning system. The thermostat controller, heating system controller and compressor controller are connected to each other only through each controller's individual connection to the hot and common power transmission lines. Each controller is capable of transmitting one or more signals that are superimposed onto the low-frequency low-voltage waveform and include information identifying a destination controller that the signals are intended for. At least one controller is capable of modifying the operation of at least one component that the at least one controller has control over in response to receiving a signal that is intended for another controller which includes information about the operation of at least one component within the climate control system.

In another aspect of the present invention, some embodiments further include at least one controller that is capable of modifying the operation of at least one component that the at least one controller has control over, in response to receiving a signal that is intended for another controller which includes information about the operation of a component within the climate control system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
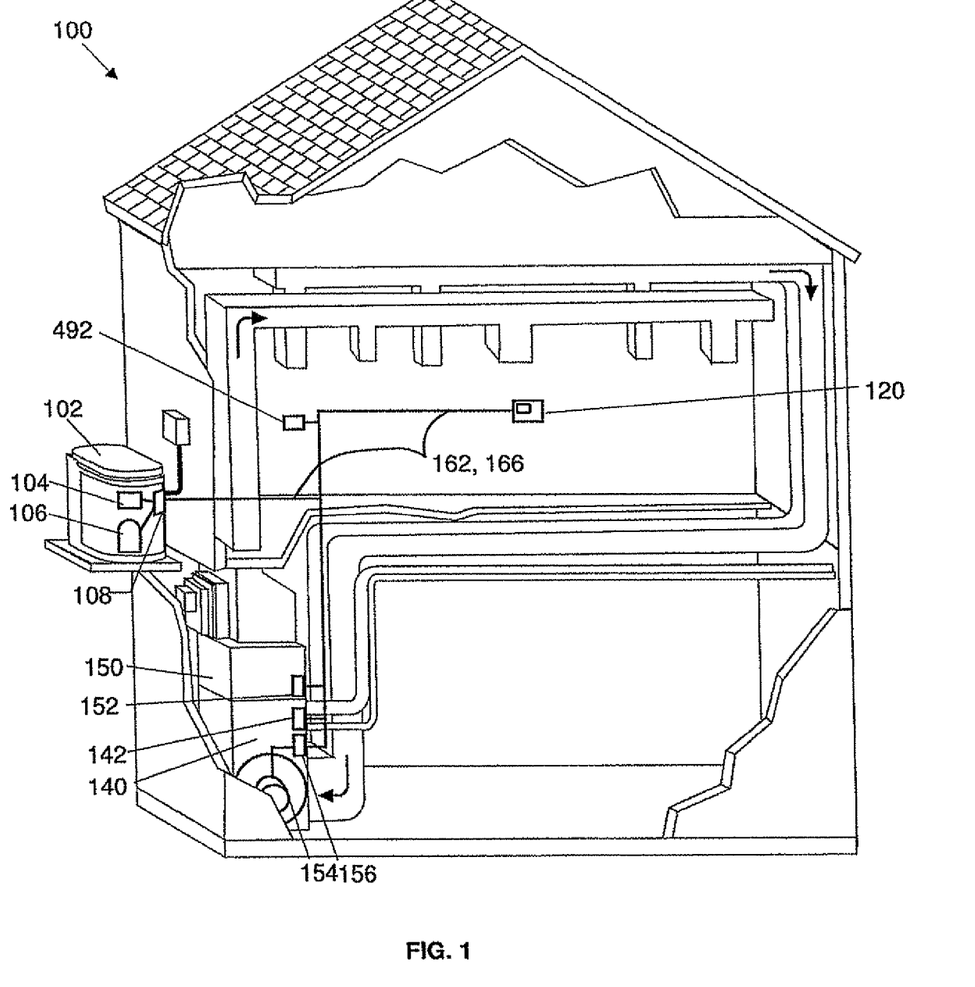
FIG. 1 is an illustration of a building comprising one embodiment of a system for controlling an HVAC system in accordance with the principles of the present invention.

The present invention relates to a climate control system having at least a heating system controller for a heating system, or at least a controller for compressor of an air conditioning or heat pump system, which controllers are capable of communicating to interactively control and improve the operation of the heating or air conditioning systems. One example of a climate control system 100 comprises a plurality of controllers for controlling the operation of the climate control system in accordance with the principles of the present invention is shown in FIG. 1. As shown and described, the climate control system 100 may include at least one air conditioner 102 comprising an outdoor condenser fan 104, a compressor 106, and an associated controller 108, at least one indoor circulator blower unit 150 having an indoor blower controller 152 and at least one thermostat 120 for controlling the operation of the various units. Some embodiments of a climate control system may comprise a heating unit 140, such as an electric or gas-fired furnace, and a related furnace controller 142, and a thermostat 120 for controlling the operation of the furnace. The heating system may comprises a blower unit 150 having a blower motor 154, which may be operated in a fan mode separate from heating or cooling operation. In addition to an air handler/blower controller 152, the circulating air system may further comprise a variable speed motor controller 156 for the circulating blower motor 154. The thermostat 120 is capable of sensing the temperature within the space and responsively initiating operation of an air conditioning or furnace unit when the sensed temperature is more than a predetermined amount above or below a set point temperature of the thermostat 120. In response to a thermostat signal request for cooling, the outdoor compressor unit controller 108 will control the switching of power to both a condenser fan motor 104 and a compressor motor 106, and the indoor blower controller 152 may directly control the blower motor 154 or indirectly control the variable speed motor controller to provide for air conditioning operation. Likewise, when the thermostat 120 signals a request for heating, the furnace controller 142 controls the activation of the furnace 140 and the circulator blower motor 154 or the circulator blower motor controller 152 to provide for heating operation. The outdoor compressor unit controller 108 may be configured to control a multi-stage or variable capacity compressor motor 106 as well as a variable speed condenser fan motor 104. Likewise, the indoor blower controller 152 and the furnace controller 142 may be configured to establish multiple operating speeds of the blower motor 154. The circulator blower controller 152 may also comprise a variable speed motor controller with an inverter driver for enabling variable speed control of the blower motor.

Figure 2:
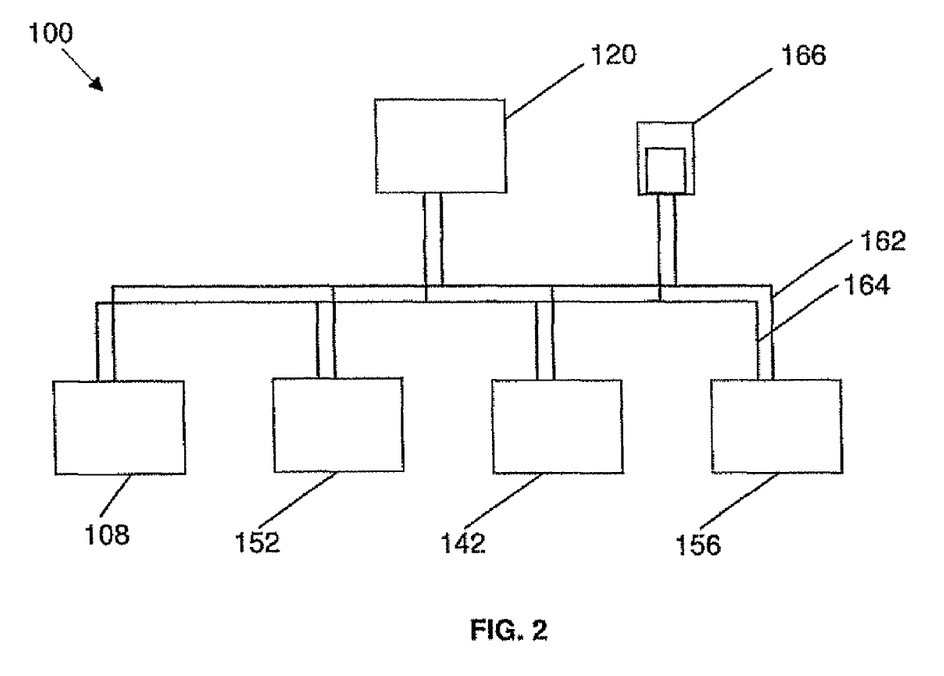
FIG. 2 is block diagram of one embodiment of an HVAC communication system.

The various controllers that control individual components within the climate control system can further communicate bi-directionally with other individual controllers, to interactively control and improve the operation of the HVAC system. Referring to FIG. 2, each of the various controllers are connected to a low voltage source, such as a 24 volt AC transformer 166, via hot and neutral power transmission lines 162 and 164. One or more of the controllers are capable of transmitting a signal across the hot and neutral power transmission lines connected to the 24 volt transformer, such that at least one controller other than the transmitting controller is capable of receiving the signal from the transmission lines of the low voltage power source. For example, the thermostat 120 in connection with the 24 volt transformer power supply is capable of transmitting a signal across the hot and neutral power transmission lines connected to the 24 volt transformer, such that the furnace controller 134 is capable of receiving the signal from the transmission lines and controlling the operation of the furnace based on the signal received from the thermostat.

Accordingly, the first embodiment of a system having one or more controllers comprises a heating system that includes a low-voltage low-frequency alternating current power source in connection with a common transmission line and a hot transmission line. The system includes a thermostat controller that is in connection with the common and hot transmission lines of the low voltage power source, and is capable of receiving and transmitting signals via the transmission lines of the low voltage power source. The heating system includes a heating system controller that is also in connection with the common and hot transmission lines of the low voltage power source. The heating system controller is capable of receiving signals from and transmitting signals via the transmission lines of the low voltage power source, wherein the heating system controller is configured to control the operation of the heating system in response to receiving one or more signals transmitted across the low voltage transmission lines from the thermostat controller which request operation of the heating system. The thermostat and heating system controller are connected to each other only through each controller's individual connection to the hot and common power lines.

In a second embodiment of a system comprising at least a heating system and one or more controllers, the controllers are capable of superimposing signals onto the low-frequency low-voltage waveform being conducted across the power transmission lines, to enable communication with other controllers. Referring to FIG. 2, the thermostat controller 120 for example, comprises a microprocessor that is capable of transmitting one or more signals for controlling the operation of a heating system. In the second embodiment, the microprocessor of the thermostat controller 30 comprises at least a transmit pin and a receive pin associated with a Universal Asynchronous Receiver Transmitter (UART) interface, for providing serial communication capability.

Likewise, the heating system or furnace controller 142 comprises a microprocessor having a UART interface. The microprocessor of the furnace or heating system controller 142 preferably controls the operation of the furnace, and is a 28 pin PIC16F microprocessor manufactured by Microchip. However, the furnace controller may alternatively comprise any microprocessor suitable for the controller application. The UART interface of the microprocessor is capable of supporting automatic baud rate detection. The microprocessor is further capable of monitoring the UART RXD pin and detecting the start of a received character by sampling an RXD signal until it detects a valid start bit comprising a low level for more than 7 cycles of the sampling clock, which is $\frac{7}{16}$ of the baud rate. When a valid start bit is detected, the receiver samples the RXD signal and detects subsequent data bits and stop bits. The UART TXD pin is likewise capable of transmitting a serial communication signal comprising a start bit, data bits and a stop bit. The microprocessor's UART TXD and RXD interface communicates signals to a Power Line Communication (PLC) transceiver that is capable of superimposing the UART serial data signals over a 60 hertz alternating current power line waveform.

Power Line Communication is a method of communicating that uses existing electrical distribution lines, such as the wires connecting 24 volt AC power to the various heating and cooling system components. Typically these devices operate by injecting a carrier wave of between 20 and 200 kHz into the household wiring at the transmitter, The high frequency carrier wave carries serial data superimposed over the low frequency 60 hertz waves on electrical transmission lines. In the second embodiment, the carrier wave may be modulated by digital signals received via an UART interface, and superimposed on a 60 hertz waveform from a 24 volt AC power source. Each of the various controllers may be connected to the 24 volt AC power source. Since the carrier signal may be propagated through out the 24 volt electrical transmission line to other controllers in connection with the 24 volt AC power source, communication of data is provided for using the low voltage power lines.

One or more of the controllers include a PLC receiver that has an individual address, such that the controller can be individually commanded by the signals that are transmitted over the 24 volt AC wiring and decoded at the PLC receiver. In the second embodiment, the furnace controller is one such controller that is capable of receiving a signal superimposed onto the 60 hertz waveform being conducted across the 24 volt AC power transmission lines, which signal may include a command specific only to the heating system controller requesting operation of the heating system. The signal decoded by the controller's PLC receiver is then communicated to the UART RXD interface to the microprocessor of the controller. Likewise, one or more of the controllers include a PLC transmitter or transceiver that is capable of superimposing a signal onto the 60 hertz waveform being conducted across the 24 volt AC power transmission lines, to transmit one or more command signals to individually command at least one other controller or HVAC component. In the second embodiment, the thermostat controller 120 is capable of superimposing high frequency signals onto the low frequency low-voltage waveform to transmit one or more command signals to the heating system or furnace controller.

Accordingly, the second embodiment of a system having one or more controllers comprises at least a heating system that includes a low-voltage low-frequency alternating current power source that conducts a low-frequency low-voltage waveform being conducted across a hot and common power transmission line. The second embodiment further includes a thermostat controller in connection with the common and hot transmission lines of the low voltage power source, the thermostat controller being capable of superimposing high frequency signals onto the low frequency low-voltage waveform. The thermostat controller is configured to transmit one or more signals across the hot and common power transmission lines via the low frequency low-voltage waveform, for requesting operation of the heating system. While the conventional HVAC system typically involves a 24 volt AC signal sent from a conventional thermostat to the furnace via a dedicated wire connected between the thermostat and the furnace, the thermostat controller of the second embodiment is capable of transmitting a signal to the furnace controller via the hot power transmission line "R" and the common power transmission line "C", independent of any signal being sent from the thermostat via a specific individual wire connected to the heating system. Thus, in the second embodiment, the thermostat controller is connected to a heating system or heating system controller only by the hot and common power transmission lines.

A third embodiment of a system having one or more controllers is provided that comprises at least a cooling system that includes a low-voltage low-frequency alternating current power source that conducts a low-frequency low-voltage waveform across the hot and common power transmission line. The third embodiment further includes a thermostat controller in connection with the common and hot transmission lines of the low voltage power source, the thermostat controller being capable of superimposing high frequency signals onto the low frequency low-voltage waveform. The thermostat controller is configured to transmit one or more high frequency signals superimposed onto the low frequency low-voltage waveform being conducted across the hot and common power transmission lines, for requesting operation of a compressor of the cooling system. The conventional HVAC system typically involves a 24 volt AC signal sent from a conventional thermostat to the compressor contactor via a dedicated wire connected between the thermostat and the compressor contactor, and a 24 volt AC signal sent from a conventional thermostat to an air handler circulator blower via a dedicated wire connected between the thermostat and the air handler unit. The thermostat controller in the third embodiment is capable of transmitting a signal to an outdoor compressor unit controller via the hot power transmission line "R" and the common power transmission line "C", independent of any signal being sent from the thermostat controller via a specific individual wire connected to the compressor controller. Thus, in the third embodiment, the thermostat controller is connected to a compressor controller of an air conditioning or heat pump system only by the hot and common power transmission lines.

The third embodiment of a system includes an outdoor compressor unit controller in connection with the common and hot transmission lines of the low voltage power source. The compressor unit controller is capable of receiving the high frequency signals superimposed onto the low frequency low-voltage waveform that are transmitted by other controllers to the compressor controller. The compressor unit controller is configured to operate at least the compressor of the cooling system in response to receiving the one or more signals transmitted from the thermostat controller requesting operation of the compressor in a desired manner.

In some embodiments, a signal may be superimposed onto a low-frequency low voltage waveform being conducted on the power transmission lines by means of a power line interface circuit that is capable of receiving serial data output from a microprocessor of the controller and transmitting the digital data using carrier frequencies that are modulated onto the 60 hertz 24 volt AC waveform being conducted on the hot and neutral power transmission lines. A digital data signal transmitted via a carrier frequency that is modulated onto the 60 hertz power line waveform may be extracted from the power line interface circuit and input to the microprocessor. The power line interface circuit comprises a connection means for connecting to the hot and common power transmission lines, a filter, and a power line interface IC chip. One example of a power line interface circuit provided by Freescale Semiconductor includes a power line interface IC chip HPCL-800J manufactured by Agilent Technologies, which is capable of receiving data through a UART interface in communication with the microprocessor of the controller. In another example of an alternative construction of a power line interface circuit, the circuit comprises connection means for coupling to the power transmission lines, a filter in connection with the connection means, and a IT800D power line interface IC chip manufactured by Yitran Communications, which is capable of receiving data through a UART interface in communication with the microprocessor. The microprocessor of a controller is accordingly able to transmit a unique digital signal having identifying information that is specific to an individual controller within the heating, ventilation, and air conditioning system, such that a controller may request a specific individual controller to operate its respective heating or cooling system components in a specific manner.

Figure 3:
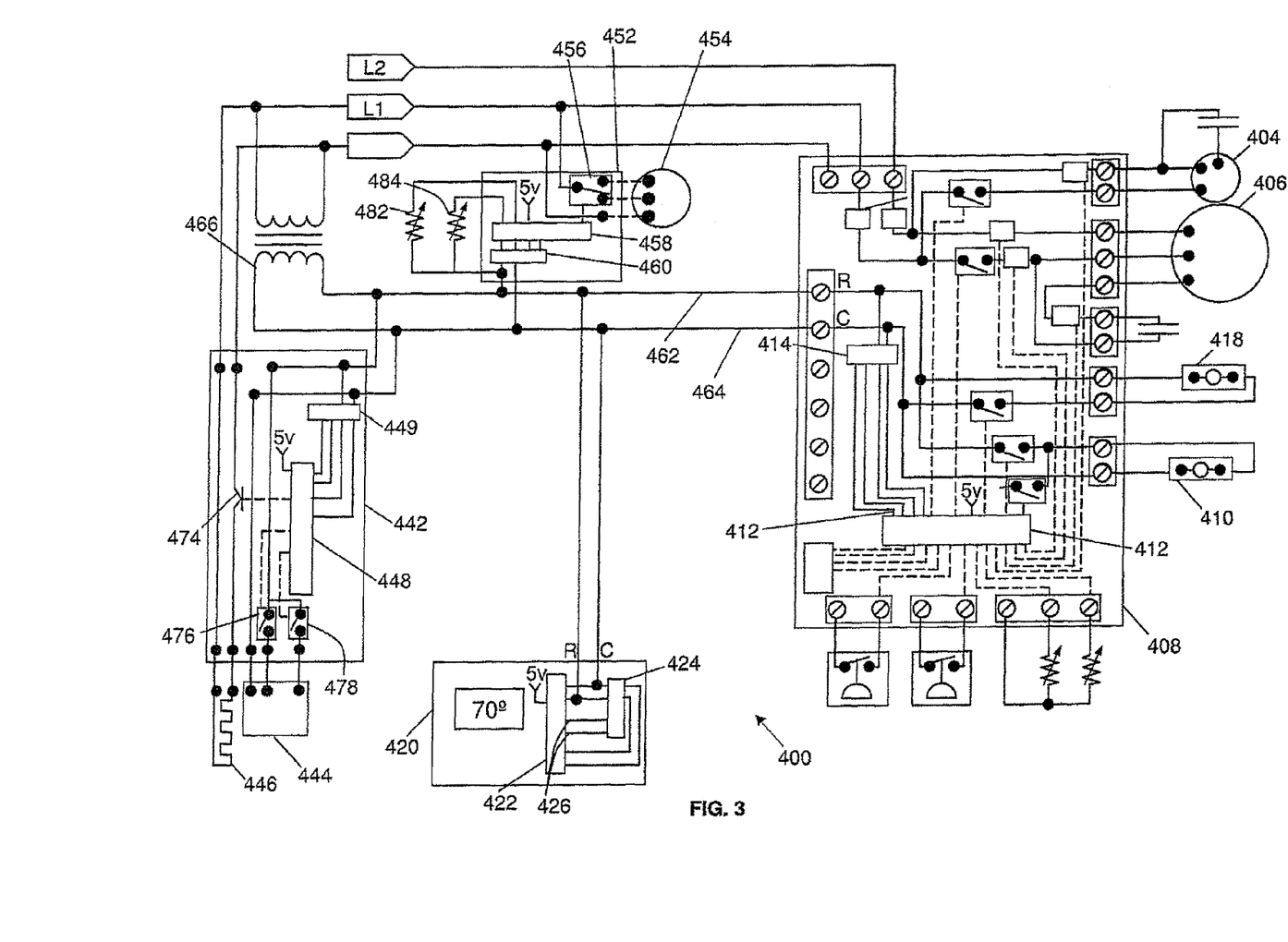
FIG. 3 is a schematic diagram of another embodiment of an interactive HVAC system in accordance with the principles of the present invention.

Referring to FIG. 3, a schematic shows a fourth embodiment of a climate control system comprising various controllers for a heating system, ventilating fan, and an air conditioning and/or heat pump system (see FIG. 1 for illustration of such systems). The climate control system 400 comprises a thermostat controller 420, an integrated furnace controller 442 for controlling a gas valve 444 and an igniter 446 of a heating system 440, an indoor air handler controller 452 and a variable speed circulator blower motor 454 associated with the heating system and/or air conditioning system that is indirectly controlled by controller 452, and an outdoor compressor/condenser fan unit controller 408 of an air conditioning system. The thermostat controller 420 is connected to hot and common 24 volt AC power transmission lines 462 and 466 in connection with a transformer 466. The thermostat controller 420 includes a power supply circuit for providing a low voltage supply (such as 5 volts) to a microprocessor 422 that controls the thermostat's operation. The thermostat controller 420 further comprises a PLC interface integrated circuit IC chip 424 that is in communication with the 24 volt AC power transmission lines 462 and 466, as well as a UART interface 426 of the microprocessor 422. The microprocessor 422 is capable of transmitting a digital data signal via the UART interface 426 to the PLC interface chip 424, which is configured to superimpose the signal as a carrier wave onto the low voltage waveform that is being conducted via the power transmission lines 462 and 466. The thermostat controller 420 may accordingly transmit a signal that is specific to an individual controller within the system, such as the integrated furnace controller 442 for example, to request the furnace controller to operate its respective components in a desired manner.

In the fourth embodiment, the integrated furnace controller 442 is connected to hot and common 24 volt AC power transmission lines 462 and 464, and includes a power supply circuit for providing a low voltage supply (such as 5 volts) to a microprocessor 448 that controls the integrated furnace controller's 442 operation. The microprocessor 448 of the furnace controller 442 may be capable of controlling one or more switching means 474 for switching 120 volts AC line voltage for powering an igniter 446 to a level sufficient to ignite gas. The microprocessor 448 may further be capable of switching one or more relays 476 and 478 for switching a gas valve 444 between low and high stage heating modes, where a multi-stage heating system is employed. The integrated furnace controller 442 further comprises a PLC interface integrated circuit IC chip 449 that is in communication with the 24 volt AC power transmission lines, as well as a UART interface of the microprocessor 448. The PLC interface chip 449 is capable of receiving and extracting a superimposed signal transmitted by another controller via the power transmission lines 462 and 464, and communicating the extracted signal to the UART interface of the microprocessor 448. The microprocessor 448 accordingly may receive a signal that is addressed specifically to the integrated furnace controller 442 requesting operation of the heating system by the thermostat controller 420. The microprocessor 448 is further capable of transmitting a digital data signal via the UART interface to the PLC interface chip 449, which is configured to superimpose the signal as a carrier wave onto the low voltage waveform that is being conducted via the power transmission lines 462 and 464. The integrated furnace controller 442 may accordingly transmit a signal that has an intended destination or is addressed to a specific individual controller within the system, such as the variable speed circulator blower motor controller 452 for example, to request the variable speed circulator blower motor 454 to operate the blower at a desired speed.

In the fourth embodiment, the indoor air handler or circulating air blower controller 452 has one or more variable speed circulator blower motor relays 456 is connected to the hot and common 24 volt AC power transmission lines 462 and 464, and includes a power supply circuit for providing a low voltage supply (such as 5 volts) to a microprocessor 458 that controls the variable speed circulating air blower controller's operation. It should be noted that the air handler may further comprise a variable speed motor controller with an inverter driver for a variable speed circulator blower motor 454, rather than a multi-speed blower with one or more speed selection relays 456. In some embodiments, the microprocessor 458 may further be capable of monitoring a pair of sensors 482 and 484 for determining the temperature difference across the indoor air conditioner evaporator coil. The variable speed circulating air blower controller 452 further comprises a PLC interface integrated circuit IC chip 460 that is in communication with the 24 volt AC power transmission lines 462 and 464, as well as a UART interface of the microprocessor 458. The PLC interface chip 460 is capable of receiving and extracting a superimposed signal transmitted by another controller via the power transmission lines 462 and 464, and communicating the extracted signal to the UART interface of the microprocessor 458. The microprocessor 458 accordingly may receive a signal that is addressed specifically to the variable speed circulating air blower controller 452 requesting operation of the variable speed circulator blower motor 454 and the one or more speed selection relays 456. The microprocessor 458 is further capable of transmitting a digital data signal via the UART interface to the PLC interface chip 460, which is configured to superimpose the signal as a carrier wave onto the low voltage waveform that is being conducted via the power transmission lines 462 and 464. The variable speed circulating air blower controller 452 may accordingly transmit a signal that that has an intended destination or is addressed to a specific individual controller within the system, such as a thermostat controller 420 for example, to notify the thermostat controller of blower motor operating information, such as a reduced capacity or a disabled condition, for example.

In the fourth embodiment, the outdoor compressor/condenser fan unit controller 408 is connected to hot and common 24 volt AC power transmission lines 462 and 464, and includes a power supply circuit for providing a low voltage supply (such as 5 volts) to a microprocessor 412 that controls the compressor/condenser fan unit's operation. The outdoor compressor and condenser fan unit controller 408 further comprises a PLC interface integrated circuit IC chip 414 that is in communication with the 24 volt AC power transmission lines 462 and 464, as well as a UART interface 416 of the microprocessor 412. The PLC interface chip 414 is capable of receiving and extracting a superimposed signal transmitted by another controller via the power transmission lines 462 and 464, and communicating the extracted signal to the UART interface 416 of the microprocessor 412. The microprocessor 412 accordingly may receive a signal that is addressed specifically to the compressor/condenser fan unit controller requesting operation of the compressor and condenser fan (such as a request from the thermostat controller 420). The microprocessor 412 is further capable of transmitting a digital data signal via the UART interface 416 to the PLC interface chip 414, which is configured to superimpose the signal as a carrier wave onto the low voltage waveform that is being conducted via the power transmission lines 462 and 464. The compressor/condenser fan unit controller 408 may accordingly transmit a signal that that has an intended destination or is addressed to a specific individual controller within the HVAC system, such as the thermostat 420 for example, to notify the thermostat of an operating condition of the compressor. The compressor controller 408 may be further capable of controlling a second stage solenoid 418 associated with a high capacity and low capacity multi-stage compressor 406. Likewise, the compressor controller 408 may be further capable of controlling a heat pump reversing valve 410 to enable operation of the compressor 406 in a heat pump mode.

The present means for communicating signals within an HVAC system is a significant departure from conventional thermostats that include several wires connected to various HVAC system controls and components. For example, in a conventional system, heating is activated when the conventional thermostat switches a 24 volt AC power source to supply a 24 volt AC signal to a specific individual wire that is connected to a heating system. Likewise, fan operation is activated when the conventional thermostat switches a 24 volt AC power source to supply a 24 volt AC signal to another specific individual wire that is connected to a blower fan motor or a fan contactor. The conventional thermostat switches a 24 volt AC signal to a specific wire for actuating each individual heating, fan or cooling system component. Accordingly, each wire in connection with a conventional thermostat is connected to a different HVAC system component. In heating system or thermostat replacement situations, wiring installed through the walls to an existing thermostat may not be color coded or distinguished from each other, and can potentially be inadvertently confused or interchanged with each other. This can make installation of a replacement conventional thermostat difficult, and can lead to inadvertent miss-wiring of the thermostat to the wrong HVAC component.

The fourth embodiment of a system provides for sending digital signals an intended destination or address of a specific controller in the system, where the signals are transmitted across the shared low voltage power transmission lines supplying power to each controller or system component. The digital data signal superimposed on the 24 volt AC waveform, and may be received by each controller or component connected to the 24 volt ac power transmission lines. The present system does not require a specific direct wire connection from the thermostat to each HVAC component, for transmission of a signal to a specific individual wire associated with a specific individual HVAC component, but rather uses only the hot and common power transmission lines for sending signals to eliminate the need for a dedicated individual wire connecting each specific individual controller to the thermostat. Thus, the various controllers are connected to each other only through the hot and common power transmission lines. In the fourth embodiment, the thermostat controller 420 may transmit a signal via the low voltage power transmission lines that includes information identifying the intended destination or address of a specific controller. Where the signal is requesting operation of a specific individual controller, the signal includes a unique command that is specific to only the individual controller that the thermostat is requesting operation of. Thus, the thermostat controller 420 could send a signal that only requests operation for a specific controller, unlike the conventional thermostat that sends a 24 volt AC signal (or half wave rectified 24 volt signal) across an individual wire that could activate any HVAC component which is connected to the wire.

The various embodiments of an HVAC system provide a means of transmitting digital data signals to components and controllers, which signals are not capable of "activating" an HVAC component as a 24 volt signal (or half wave rectified 24 volt signal). The transmitted digital signals are sent across the low-voltage power transmission lines that supply power to the various HVAC controllers and components, rather that via a specific individual wire used to control activation of an HVAC system component. Unlike conventional systems, where a 24 volt AC waveform or a rectified 24 volt AC waveform may be conducted via a specific individual wire to activate an HVAC control connected to the individual wire, or where a 24 volt AC waveform that powers a control may be half wave rectified to both signal activation of the control and power the control as well, the present means of communication does not transmit a signal via a specific wire connected to an individual HVAC control to "activate" the HVAC control. Rather, the present means transmits a digital signal that will only request operation of a specific HVAC component, by virtue of a command that is unique to the specific controller. This prevents the possibility of tampering that is present in a conventional system, where an individual wire that transmits a 24 volt AC "activation" signal (or half wave rectified signal) could be jumpered or connected to an HVAC control or component to operate the component.

Various embodiments of the present invention also provide for interactive communication between a first controller and another controller in the heating, ventilation, and cooling system, to improve control of HVAC system operation. For example, in the fourth embodiment, the system comprises an integrate furnace controller 442, for controlling the operation of one or more components of the heating system. The integrate furnace controller 442 is capable of modifying the operation of the one or more heating system components it controls, such as a two-stage gas valve, in response to receiving information transmitted via the power transmission lines about the operation of another controller or component within the heating, ventilation, and air conditioning system. The controller for a circulating air blower may, for example, include a variable speed circulator blower motor controller with an inverter driver, which if overheated would reduce the speed of the circulator blower. The blower controller could responsively communicate its reduced speed information by transmitting a signal via the hot and common power transmission lines. The signal may be intended for a specific controller, such as the thermostat controller 420 or the integrated furnace controller 442. Where the signal is intended for the integrated furnace controller 442, the integrated furnace controller 442 would respond to the blower's reduced speed signal by modifying its operation to that of only low stage heating operation to correspond to the reduced circulator blower speed. The integrated furnace controller 442 would operate in low stage heating mode even though the thermostat controller 420 has requested the integrated furnace controller 442 to operate the furnace at high stage heating. Where the signal includes an address or intended destination of a thermostat controller 420, the integrated furnace controller 442 may still "listen" to the signal intended for the thermostat controller 420, and responsively restrict operation to low stage heating. Likewise, where the furnace shuts off after sensing an over-temperature condition, the furnace controller may signal the blower controller to continue operating until the over-temperature condition is alleviated. Accordingly, a single signal transmission intended for a specific controller that includes information of an operating condition can improve operation of multiple controllers. The integrated furnace controller 442 could, for example, communicate the restriction of its heating operation to the thermostat controller 420, which would alert the occupant of a need for service.

In one aspect of the present invention, some embodiments provide one or more controllers for a climate control system, where at least one controller is capable of modifying the operation of one or more system components under its control in response to receiving a signal transmitted by another controller that includes information about the operation of another component or controller in the climate control. For example, in the fourth embodiment, the system may comprise at least two controllers for controlling the operation of one or more components of the cooling system. The at least two controllers can communicate via the power transmission lines to provide for operation in either a full capacity mode of operation or a reduced capacity mode of operation, based on the communication by one of the at least two controllers of information relating to the operation or condition of a component under the individual controller's control. For example, after the thermostat controller 420 transmits a signal requesting compressor operation, a first air handler/circulating air blower controller 452 is not capable of operating, a first air handler controller may detect the operation failure (by a pressure sensor, motor current sensor, or temperature sensor for example) and transmit a signal via the power transmission lines communicating the failure to another controller. The signal may be intended for a specific controller, such as the thermostat controller 420 or the compressor unit controller 408. Where the signal is intended for the compressor unit controller 408, the compressor unit controller 408 could respond to the information of a blower failure by modifying its operation to shut down the compressor to protect the compressor motor from possible damage due to the indoor coil unit freezing up. The compressor unit controller 408 would shut down even though the thermostat controller 420 is still requesting operation of the compressor. Where the signal includes an address or intended destination of a thermostat controller 420, the compressor unit controller 408 may still "listen" to the signal intended for the thermostat controller 420, and responsively shut down the compressor to protect the compressor. The compressor unit controller 408 could subsequently transmit a signal via the power transmission lines that is addressed to the thermostat controller 420, for communicating the shut down of the compressor due to the temperature, or high motor current for example), the compressor unit controller could restrict operation to low capacity mode and transmit a signal via the power transmission lines communicating the restriction. The signal may be intended for the second controller 452 for an air handler circulating air blower, or for the thermostat controller 420. Where the signal is intended for the circulating air blower controller 452, the circulating air blower controller 452 could receive the signal and responsively reduce the circulator blower speed to correspond to the low capacity compressor mode of operation to allow the air conditioning system to operate in a limp-along mode until the air conditioning system can be serviced. The compressor and circulating air blower would be operated at a low capacity mode even though the thermostat controller 420 is still requesting operation at high capacity. Where the signal includes an address or intended destination of a thermostat controller 420, the circulating air blower controller 452 may still "listen" to the signal intended for the thermostat controller 420, and responsively reduce the circulator blower speed to correspond to the low capacity compressor operation mode.

In yet another aspect, some embodiments of an interactive system may comprise controllers having a microprocessor that is capable of transmitting one or more unique data signals through a UART interface. The microprocessor is configured to communicate a valid start bit followed by subsequent data bits of a signal to be transmitted via the power lines. Referring to Table 1 below, the serial data signal includes one or more data bits, the first data bit of which comprises a destination node or address that the serial data signal is intended to be received at. The serial data signal further comprises a subsequent data bit that includes the sender's node or address, and may further include a subnet node or address. The data signal may further comprise a node type data bit and device request data bit, which permit a controller (such as a thermostat) to take control of the communication transmissions being sent over the power transmission lines.

TABLE 1

| Message Configuration | | | | | | | | | | |
|---|---|---|---|---|---|---|---|---|---|---|
| Addressing | | | 3rd Party | Special | | Function | Messages | | | CRC |
| Byte 0 | Byte 1 | Byte 2 | Byte 3 | Byte 4 | | Byte 5 | Byte 6 | Byte 7 | Bytes 8-(N-2) | Bytes N |
| Destination Node Address | Sender Address | Subnet | Node Type | Device Request | Payload Config | Message Type | Packet Number | Payload Length | Data Payload | Checksum |
| 8 Bits | 8 Bits | 8 Bits | 8 Bits | 4 Bits | 4 Bits | 8 Bits | 1 Byte | 1 Byte | 1 to 245 bytes | 2 Bytes |
| (0-255) | (1-255) | (0-255) | (0-255) | (0-15) | (0-15) | (0-255) | (0-255) | (0-245) | (1-N) | (0-65535) | information on the failed circulator blower, such that the thermostat controller 420 may alert the occupant of a need for service.

In yet another aspect, some embodiments of an interactive system may comprise at least two controllers that communicate information via the power transmission lines to provide for controlling operation of one or more system components in either a full capacity mode or a reduced capacity mode of operation based on the communication of information relating to the operation of one of the at least two controllers. For example, in the fourth embodiment, the system comprises at least two controllers that together provide for the operation of a multi-stage air conditioning system capable of operating in a high capacity or a low capacity mode. If a first compressor unit controller is not able to continuously operate the compressor in high capacity mode (due to a high discharge line The serial data signal transmitted by the controllers comprises a node type data bit, which permits controllers that are capable of a listen mode to monitor signals transmitted by other controllers, such that one or more listening controllers may modify the operation of their respective HVAC components in response to operating information signals transmitted by other controllers. For example, if an outdoor compressor unit controller communicates a signal indicating that the compressor has been restricted to low capacity operation, the indoor air handler unit controller listening to the signal could respond to the operating information by modifying operating of the circulator blower to a reduced speed that corresponds with the low capacity compressor operation. Node types could include controllers for any of the following number of HVAC components or subsystems listed in Table 2 below

TABLE 2

Node Types

| Node Type | Node ID |
| --- | --- |
| Thermostat | 0 |
| Gas Furnace | 1 |
| Air Handler | 2 |
| Unitary Air Conditioner | 3 |
| Unitary Heat Pump | 4 |
| Electric Furnace | 5 |
| Package System (Gas) | 6 |
| Packager System (Electric) | 7 |
| Ceiling fan | 8 |
| Whole house fan | 9 |
| Air Exchanger | 10 |
| Dehumidifier | 11 |
| Electronic Air Cleaner | 12 |
| ERV | 13 |
| Humidifier (Evap) | 14 |
| Humidifier (Steam) | 15 |
| HRV | 16 |
| IAQ Analyzer | 17 |
| Media Air Cleaner | 18 |
| Zone control | 19 |
| Zone master | 20 |
| UV Light | 21 |
| Boiler | 22 |
| Gas Water Heater | 23 |
| Electric Water Heater | 24 |
| Commercial Water Heater | 25 |
| Pool Heater | 26 |
| Bus Interface Module | 27 |
| Gateway | 28 |
| Diagnostic Device | 29 |
| Lighting Control | 30 |
| Security System | 31 |
| Fuel cell | 32 |
| Spare | 33-255 |

In the various embodiments, the controllers monitor the 24 volt waveform conducted via the power transmission lines for transmission signals, and are capable of listening to data signals from various transmission sources that are intended for a different destination address (or controller). While a signal may be intended for a given destination address, other controllers may still "listen" to or receive these signals and analyze them depending on the node type of the sender of the signal. The listening mode of the controllers provides for sharing information that reduces the number of signal transmissions by eliminating request signals for information, and also provides for improved diagnostic capability, component safety, fault protection, and occupant safety.

For example, a transmitted signal may includes a source address (and node type) of an outdoor compressor unit controller and a destination address of the thermostat, and may communicate diagnostic information of a high Discharge Line Temperature (DLT) upon start up of the compressor, indicating a possible low refrigerant charge that may require servicing. A controller for the indoor air handler may listen to the message from the compressor unit node type, and responsively compare the sensed temperature difference across the indoor A-coil to a predetermined delta to evaluate whether the difference is out of range, which would confirm that the refrigerant charge is low. The indoor air handler controller could then communicate a confirmation of a low refrigerant charge to the thermostat controller, to prompt the thermostat to alert the occupant of the need for servicing of the low charge condition.

In another example, a thermostat controller could transmit a signal to a controller 408 for a compressor of an air conditioning or heat pump system to request operation of the compressor. The controller of the air handler's circulating air blower could "listen" to or receive the signal and responsively check its line voltage level sensing circuitry associated with a variable speed inverter driver for a blower motor, to verify that the line voltage level is not below a threshold value indicative of a brown out condition. If the circulating air blower controller 452 determines that a low line voltage condition exists, the circulating air blower controller 452 could transmit a signal including the low line voltage information to the compressor controller 408, which could responsively discontinue operation to protect the compressor from being damaged by the low voltage condition. This type of interactive communication can accordingly provide component protection against damage for one of more components in the climate control system.

In another example, occupant safety is provided in a situation of a presence of an unsafe level of carbon monoxide. In a climate control system that at least includes a fuel-fired heating system and a thermostat controller in connection with a common and hot power transmission lines, the system may further include a fuel-fired water heater in connection with the power transmission lines. A controller for the fuel fired water heater is connected to the hot and common power transmission lines and is capable of receiving and transmitting signals superimposed onto the low frequency low-voltage waveform. The fuel-fired heating system controller 442 is capable of modifying the operating of the heating system by shutting down, in response to "listening" to a signal transmitted by the water heater controller that is intended for the thermostat controller 420, which includes information about the presence of a harmful level of carbon gas or a presence of flammable vapors. In either case, the furnace or heating system would discontinue operation to help improve the safety of the occupants. Likewise, a carbon monoxide detector 492 could also be configured to provide an indication of a harmful carbon monoxide level which may be communicated through a high frequency signal superimposed onto the low frequency low-voltage waveform to alert the thermostat controller. The heating system controller would be capable of "listening" to or receiving the signal intended for the thermostat controller which includes information about a harmful carbon monoxide level, and responsively discontinues operation of the heating system (eg. —gas valve 444 and combustion blower 404).

The usage of node types is one way of receiving data from other devices one the network without having to initiate a request signal for information. The various controllers or subsystem devices can be in a listen mode to monitor the signals transmitted by certain node types to get information from that subsystem device or controller. Alternatively, the various controllers can also request transmission of information from other controllers. In order to determine what can be requested from other controllers or devices that are in communication via the power transmission lines, a controller device may transmit a device request to query what types of devices are present.

The serial data signal transmitted by the controllers comprises a device request bit, which enables an controller to request another controller that is controlling communication to release control, such that the requesting controller may be allowed to communicate a request for specific information (from another controller for example) in a peer-to-peer manner. For example, if an outdoor compressor unit controller detects a possible low refrigerant charge condition, the outdoor compressor unit controller could request the indoor air handler unit controller to communicate specific information relating to whether the sensed temperature difference across the A-coil is out of range, which would confirm that the air conditioner refrigerant charge is low. This information could also be communicated to the thermostat to alert an occupant of the low refrigerant charge condition.

In some embodiments, a communication coordinator may be employed in connection with the power transmission lines. Where a communication coordinator is used, a controller device may transmit via the power transmission lines a request of the coordinator to provide a network configuration request. The request is made after the coordinator makes a periodic request of subordinate device status. This would allow an individual controller to include itself in the network of other controllers identified by the coordinator. Each controller device (or node) may further communicate a request to the communication coordinator (after the coordinator makes a periodic request of subordinate device status) to take control of the communication being sent across the power lines, for enabling the requesting controller to transmit a signal intended for another controller. The coordinator would respond by sending signals to controllers other than the requesting controller to suspend transmission until the next periodic request for status by the coordinator. The requesting controller could then transmit a signal intended for another controller that contains a request for operation, or relevant operating information, for example. In this manner, each controller may communicate to other controllers via the power lines without a likelihood of signal interference, since the transmitting control would have dominant control over the lines.

The serial data signal transmitted by the controllers comprises a payload data configuration byte. The payload configuration bits are used in determining what type of data packet is being received. These bits are located in byte 3 of every data packet sent in bits 0-3. The message type is contained in Byte 5 of the packet, and may provide information as to whether the signal is interrogating or requesting information from another controller or a component, whether the signal is of a sensor data type, whether the signal is a unique command signal intended for a specific controller or component in the system, or whether the signal is an operating informational message intended for a specific controller in the system, such as a thermostat. The message may be a code which other controllers may recognize. The message may also be a text message intended to be displayed by the thermostat controller to an occupant. In this manner, a controller may provide more specific repair or maintenance information than a code. Table 2 below outlines some of the types of messages that may be employed in the various embodiments of an HVAC system.

TABLE 2

Message Type.

| Message Type | Message Name | Description |
| --- | --- | --- |
| 0 | Ready | Used to make normally subordinates a coordinator |
| 1 | Status Request | Used to request operating status of a controller or its respective components |
| 2 | Status Reply | |
| 3 | Control Command | Commands a specific controller/component to operate in a desired mode |
| 4 | Configuration Request | Installation Parameter info used to configure controllers and components |
| 5 | Configuration Data | |
| 6 | Sensor Read Request | Serial communication by any external/internal sensors in a subsystem that can be shared with the system |
| 7 | Sensor Data | |
| 8 | Spare | |
| 9 | Set Address | |
| 10 | Event Request | Request Data defined as historical operating information of a specific controller or component in the system. |
| 11 | Event Reply | |
| 12 | ID Request | Identification Data of individual controllers and components in the system |
| 13 | ID Set | |
| 14 | ID Reply | |
| 15 | Node Type Request | |
| 16 | Node Type Reply | |
| 17 | Message Config Request | Used to determine which messages are applicable per specific component or controller in the system. |
| 18 | Message Config Reply | |
| 19 | Display Control Request | Used to take control of the thermostat display to provide installation/diagnostic/System Checks or any other subsystems needs. (text message may vary in length) |
| 20 | Display Control Reply | |
| 21 | Shared Device Data Request | Installation Specific Configuration Data used for transmitting data to shared networks or external network |

The various embodiments provide for one or more controllers in connection with low voltage power lines for powering the one or more controllers, which controllers are further capable of transmitting one or more communication signals via the low voltage waveform. While each signal may be intended for a specific controller, at least one controller may listen to signals intended for other controllers and may modify the operation of at least one component that the at least one controller has control over in response to receiving a signal that is intended for another controller which includes information about the operation of a component within the system. The one or more controllers may transmit text messages to a thermostat controller to alert an occupant of specific maintenance requirements, such as a low refrigerant charge or an over-temperature condition of the furnace. The controllers in the various embodiments could continue to provide cooling or heating operation in a "limp along" mode, while alerting the occupant of specific service or repair needs via a text message, before the heating or cooling system becomes inoperable, The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A heating and ventilation system comprising:
an alternating current power source that conducts a low-frequency low-voltage waveform across hot and common power transmission lines;
a thermostat controller, a controller for a heating system, and a controller for a circulating air blower, the thermostat controller, heating system controller and circulating air blower controller being connected to each other only through each controller's individual connection to the hot and common power transmission lines, wherein each controller is capable of transmitting one or more signals that are superimposed onto the low-frequency low-voltage waveform and include information identifying a destination controller that the signals are intended for,
the thermostat controller being capable of transmitting one or more signals which specifically request operation of the heating system controller for establishing operation of the heating system, and which may not establish operation of any other controller;
wherein at least one controller is capable of modifying the operation of at least one component that the at least one controller has control over in response to receiving a signal that is intended for another controller which includes information about the operation of a component within the heating and ventilation system.

2. The heating and ventilation system of claim 1 wherein the thermostat controller is capable of modifying the operation of the heating system to a reduced capacity level in response to receiving a signal transmitted by the circulating air blower controller which is intended for the heating system controller and includes information about the circulating air blower operating at a reduced capacity.

3. The heating and ventilation system of claim 1 wherein the heating system controller is capable of modifying the operation of the heating system to a reduced capacity level in response to receiving a signal transmitted by the circulating air blower controller which is intended for the thermostat controller and which includes information about the circulating air blower operating at a reduced capacity.

4. The heating and ventilation system of claim 1 wherein the heating system controller is capable of modifying the operation of the heating system to shut down in response to receiving a signal transmitted by the circulating air blower controller which is intended for the thermostat controller and which includes information about the circulating air blower operation being disabled.

5. The heating and ventilation system of claim 1 wherein the heating system controller is capable of communicating one or more signals to at least the thermostat controller that includes a message providing information relating to the operating condition of one or more components in the heating and ventilation system.

6. The climate control system of claim 1 further comprising a controller for a fuel fired water heater that is connected to the hot and common power transmission lines and is capable of receiving and transmitting signals superimposed onto the low frequency low-voltage waveform, the heating system controller being capable of modifying the operating of the heating system by shutting down in response to receiving a signal transmitted by the water heater controller which is intended for the thermostat controller and includes information about the presence of a harmful level of carbon gas.

7. An air conditioning and or heat pump system comprising:
an alternating current power source that conducts a low-frequency low-voltage waveform across hot and common power transmission lines;
a thermostat controller, a controller for an outdoor compressor, and a controller for an air handler having a circulating air blower and an evaporator coil, the thermostat controller, outdoor compressor controller and air handler controller being connected to each other only through each controller's individual connection to the hot and common power transmission lines, wherein each controller is capable of transmitting one or more signals that are superimposed onto the low-frequency low-voltage waveform and include information identifying a destination controller that the signals are intended for,
the thermostat controller being capable of transmitting one or more signals which specifically request operation of only the compressor controller for establishing operation of the compressor only, and one or more signals which specifically request operation of only the air handler controller for establishing operation of the circulating air blower only;
wherein at least one controller is capable of modifying the operation of at least one component that the at least one controller has control over in response to receiving a signal that is intended for another controller which includes information about the operation of a component within the air conditioning and or heat pump system.

8. The air conditioning and or heat pump system of claim 7 wherein the air handler controller is capable of modifying the operating capacity of the circulating air blower in response to receiving a signal transmitted by the compressor controller which is intended for the thermostat controller and includes information about the operating capacity of the compressor.

9. The air conditioning and or heat pump system of claim 7 wherein the air handler controller is capable of modifying the operating of the air handler by sensing the temperature difference across the evaporator coil to verify a low refrigerant charge condition, in response to receiving a signal transmitted by the compressor controller which is intended for the thermostat controller and includes operating information about a high discharge temperature at the compressor indicating a possible low refrigerant charge.

10. The air conditioning and or heat pump system of claim 7 wherein the compressor controller is capable of modifying the operating of the compressor by shutting down in response to receiving a signal transmitted by the circulating air blower controller which is intended for the thermostat controller and includes information about the circulating air blower operation being disabled.

11. The air conditioning and or heat pump system of claim 7 wherein the compressor controller is capable of modifying the operating of the compressor by shutting down in response to receiving a signal transmitted by the circulating air blower controller which is intended for the thermostat controller and includes information about the line voltage to the circulating air blower controller being below a threshold level.

12. The air conditioning and or heat pump system of claim 7 wherein each controller is capable of communicating one or more signals to at least the thermostat controller that includes a message providing information relating to the operating condition of one or more components in the air conditioning and or heat pump system.

13. An air conditioning and or heat pump system comprising:
- a pair of transmission lines configured to transmit and receive signals thereon;
- a thermostat controller connected to the pair of transmission lines, the thermostat controller being configured to transmit, via the transmission lines, a signal including the address of a specific controller that the signal is intended for, and a unique command that is specific to the individual controller that the thermostat is requesting operation of;
- a circulating air blower controller connected to the pair of transmission lines, the circulating air blower controller being configured to receive a signal including the address of the circulating air blower controller and a request to operate the circulator blower motor, and configured to transmit a signal including the address of the thermostat controller and information indicating that the circulator blower is not operating;
- an outdoor compressor unit controller connected to the pair of transmission lines, the outdoor compressor unit controller being configured to receive a signal including the address of the outdoor compressor unit controller that requests operation of the compressor, wherein the outdoor compressor unit controller is configured to monitor a signal including the address of the thermostat controller and information indicating that the circulator blower is not operating, and responsively shut down the compressor to protect the compressor, wherein in response to shutting down the compressor, the outdoor compressor unit controller is configured to transmit a signal including the address of the thermostat controller and information indicating a non-operating condition of the compressor.

14. The air conditioning and or heat pump system of claim 13, wherein the circulating air blower controller is configured to transmit a signal including, in addition to the address of the thermostat controller and information indicating that the circulator blower is not operating, a node type of the circulating air blower controller, and the outdoor compressor unit controller is configured to monitor signals including the node type of the circulating air blower controller and to respond to information indicating that the circulator blower is not operating.

15. The air conditioning and or heat pump system of claim 13, wherein the thermostat controller is configured to alert an occupant of a need for service in response to receiving a signal including the address of the thermostat controller and information indicating that the circulator blower is not operating, or a signal including the address of the thermostat controller and information indicating a non-operating condition of the compressor.

* * * * *